UNITED STATES PATENT OFFICE.

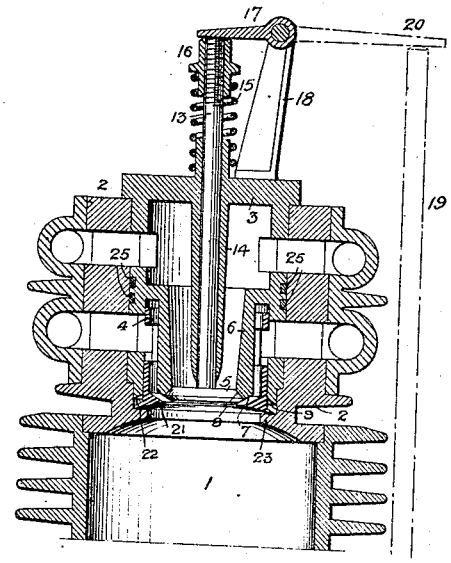
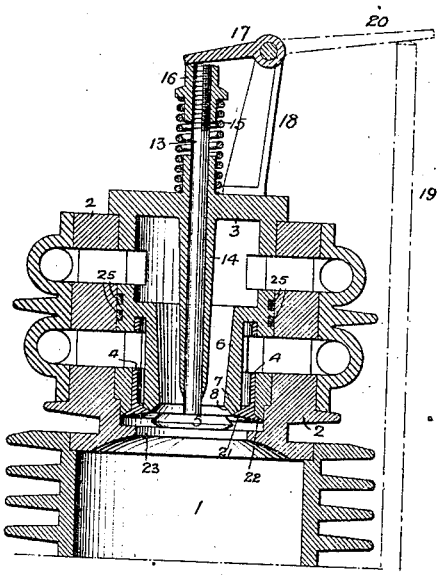
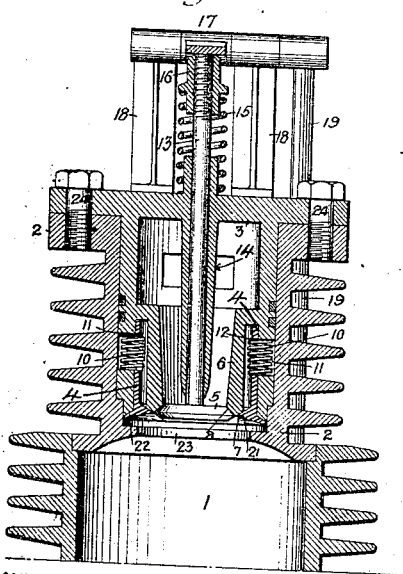
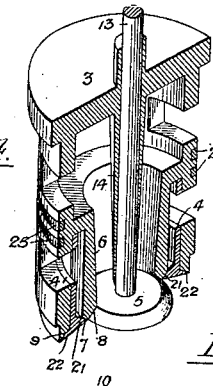
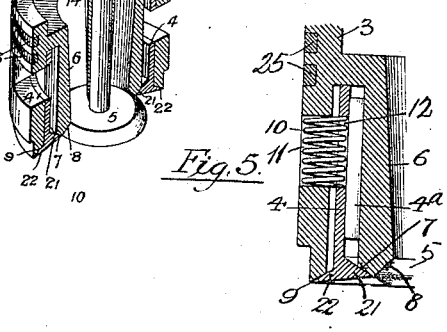

WILLIAM HENRY, OF PHILADELPHIA, PENNSYLVANIA.

VALVE FOR INTERNAL-COMBUSTION ENGINES.

1,034,707.  Specification of Letters Patent.   Patented Aug. 6, 1912.

Application filed June 7, 1905. Serial No. 264,161.

*To all whom it may concern:*

Be it known that I, WILLIAM HENRY, a citizen of the United States, residing in Philadelphia, Pennsylvania, have invented certain Improvements in Valves for Internal-Combustion Engines, of which the following is a specification.

My invention relates to internal combustion engines, and consists of certain improvements in the inlet and exhaust valves employed in connection with the same; the object of my invention being to simplify the construction of and mode of operating such valves; to effect their cooling by the incoming charge, and to permit their ready removal and renewal should such action become necessary or desirable.

My invention is fully shown in the accompanying drawing, in which:

Figure 1, is a sectional elevation of the valve structure forming the subject of my invention, showing the position of the valves on the intake stroke of the engine; Fig. 2, is a sectional view taken at right angles to Fig. 1, showing the valves in their position on the compression and power stroke of the engine; Fig. 3, is a sectional elevation similar to Fig. 1, showing the position of the valves on the exhaust stroke of the engine; Fig. 4, is a sectional perspective view of the valves and valve cage detached, and Fig. 5, is a sectional view of a modified form of valve cage.

In the drawing, 1 represents the cylinder of the engine, which, in the present instance, is of the type known as "air cooled", the external wall of the cylinder being provided with a series of ribs or flanges providing for the radiation of the heat generated within the cylinder.

Mounted at the top of the cylinder and secured thereto in any proper or desirable manner, is a shell or casing 2 carrying a valve cage 3 in which is mounted the inlet valve 4 and exhaust valve 5, such cage having an internal sleeve or annular wall 6 providing seats 7 and 8 for said valves, and an additional seat 9 on its outer wall for the inlet valve.

The valve 4 controls the inlet of the explosive mixture while the valve 5 controls the exhaust of the burned and waste gases. The valve 4 is in the form of a sleeve or cylinder, and is disposed within and adjacent to the outer wall of the valve-cage 3; being supported in the normally raised position by means of light springs 10 arranged in registering apertures 11 and 12 formed respectively in the wall of said valve 4 and in the wall of the valve cage. The springs engage said parts in the manner shown and serve to close the valve at the commencement of the compression stroke and support it in the closed position. The exhaust valve is carried by a stem 13 fitting a sleeve 14 within the valve cage; a spring 15 being disposed on said stem between the upper and outer end of said sleeve, and a nut 16 on the upper end of said stem, and serving to hold said valve in the closed position. To depress the stem 13 and open the exhaust valve, a lever 17 is carried by brackets 18 secured to the top of the valve cage, and a rod 19 operated by suitable means, (usually a cam operated from the driving shaft, not shown), engages the end 20 of this lever raising the same and thereby depressing the stem of the exhaust valve and opening the latter.

The annular shell or wall 6 of the valve cage may be formed integral with the same, such construction being preferable as there is no possible chance for the inlet charge and exhaust gases mixing or interfering. The inlet valve 4, in the form of a shell or sleeve as noted, is provided with internal and external beveled flanges 21 and 22, adapted to engage the seats 7 and 9 carried by the valve cage, and these flanges lie in the path of the incoming charge. The inlet valve opens under suction caused by the movement of the piston on the intake-stroke, and the explosive mixture during its initial movement will find its way into the cylinder on both sides of the valve 4. To limit the movement of this valve, I provide the casing 2 with a shelf or ledge 23 directly below the valve cage and in the path of the inlet valve 4, and when said valve contacts therewith, by far the greater part of the incoming charge will be diverted to the internal passage of the valve, and passing over the seat 7, will tend to cool the same and the exhaust valve and its seat. It will be noted, moreover, that the incoming charge passing through the chamber which is formed in the valve cage 3 and striking the internal annular wall 6, tends to keep these parts cool; at the same time cooling the inlet valve and the springs supporting the same. The incoming charge as it passes to the cylinder is directed toward the center by the internal flange 21 and contacting with the exhaust valve affords means for cooling the latter. The valve casing may be secured to the outer casing by means of screw-bolts 24, which can be readily removed when it is desired to examine the same or effect any repairs.

The valve cage is provided with packing rings 25 carried by its outer wall to insure no leakage of the inlet charge or exhaust gases between the same and the casing 2. This outside shell or casing 2 inclosing the valve structure may be provided with annular ribs in the same manner as the cylinder, or with other means, providing for the radiation of the heat generated within the engine and valve structure and insuring the proper cooling of the same.

In the valve cage shown in Figs. 1, 2, 3 and 4, I have provided concentric walls, the sleeve inlet valve 4 fitting snugly to the outer wall. Such arrangement may be modified in the manner shown in Fig. 5, however, in which the sleeve valve 4 is free from contact with the outer wall of the cage, and is guided in its movement by ribs 4ª on its inner side contacting with the inner wall of the cage, so that the fluid will pass down on both sides of the sleeve valve, and will escape between both flanges 21 and 22 and their respective seats.

In the drawing herewith, I have shown the valve carrying structure mounted in a casing secured to the cylinder. It will be understood, however, that such casing and cylinder may be made in one piece. I may also mount the valve structure at one side of the cylinder and reverse the position of the same so that the rod 19 can act directly on the stem of the exhaust valve. The general arrangement and operation of the valves will remain unchanged, however.

The structure which I have designed, is extremely simple in construction, cheaply manufactured and positive in its action. All parts of the structure are readily renewable and either valve may be removed and replaced in the simplest manner.

Having thus described my invention, I claim and desire to secure by Letters Patent:

1. The combination, in a valve structure, of a valve cage having ports, a wall carried by said cage and having seats, a valve engaging the inner seat and controlling the exhaust, and a sleeve valve engaging the outer seat and controlling the inlet, both of said valves opening in the same direction.

2. The combination with an internal combustion engine, of a casing having inlet and exhaust ports, a valve cage mounted within said casing and having similar ports, a wall carried by said cage and having valve seats, a valve engaging one seat and controlling the exhaust, and a sleeve valve engaging the other seat and controlling the inlet of the explosive charge.

3. The combination with an internal combustion engine, of a casing having inlet and exhaust ports, a valve cage mounted within said casing and having similar ports, an internal annular wall carried by said cage and having valve seats, a valve engaging the inner seat and controlling the exhaust, and a sleeve valve engaging the outer seat and controlling the inlet of the explosive charge.

4. The combination with an internal combustion engine, of a valve cage having inlet and exhaust ports, an internal annular wall formed integral with said cage and having valve seats, the outer wall of said cage having a seat, a valve engaging the inner seat and controlling the exhaust, and a sleeve valve disposed concentric to the exhaust valve and engaging the outer seat of the internal annular wall and the seat formed on the outer wall of the cage and controlling the inlet of the explosive charge.

5. The combination with an internal combustion engine, of a valve cage, a sleeve valve controlling the inlet of the explosive charge, said sleeve valve and the wall of said cage having registering openings, and springs disposed in said openings for holding said valve in the normally closed position.

6. The combination with an internal combustion engine, of a valve cage having inlet and exhaust ports, an internal annular wall formed integral with said casing and having valve seats, a valve engaging the inner of said seats and controlling the exhaust, a sleeve valve disposed concentric to the exhaust valve and engaging the outer seat and controlling the inlet of the explosive charge, said sleeve valve and said cage having registering openings, and springs disposed in said openings for holding said valve in the normally closed position.

7. The combination, in a valve structure, of a valve cage, an annular sleeve having a portion forming an inlet valve mounted in said cage, an exhaust valve, both of said valves being arranged to open in the same direction, and an inner annular wall carried by said cage and having seats for said valves.

8. The combination with an internal combustion engine, of a valve cage or casing having inlet and exhaust ports, an inlet valve comprising an annular sleeve carried by said cage, an exhaust valve, and an inner sleeve or annular wall against which said valves seat, said casing having an additional seat for the inlet valve.

9. The combination with an internal combustion engine, of a valve cage or casing, an inlet valve comprising an annular sleeve carried by said casing, means for holding said valve normally closed, an exhaust valve, means for holding the same to its seat, an inner sleeve or annular wall carried by the cage against which said valves seat, and means for positively opening the exhaust valve.

10. A valve structure comprising a casing, a valve cage carried therein, an internal wall carried by said cage, an exhaust valve seating against said wall, a sleeve inlet valve concentric to the exhaust valve and seating against said wall, and packing carried by the outside wall of the cage and contacting with the inner wall of the casing.

11. A valve structure comprising a casing, a valve cage mounted therein, an exhaust valve carried by said cage, an inlet valve carried by said cage, and means adjacent the discharge opening of said valve to limit its opening movement.

12. A valve structure comprising a casing, a valve cage mounted therein, an exhaust valve carried by said cage, an inlet valve carried by said cage, and a shelf or shoulder serving to limit the movement of the inlet valve.

13. The combination, in a valve structure, of a valve cage having inner and outer walls, one of which is ported, and an inlet valve comprising a ported sleeve movably mounted in said cage between said walls and having an annular flange at one end, the inner wall carried by said cage having an edge against which the flange of said sleeve seats.

14. The combination, in a valve structure, of a valve cage having inner and outer walls, one of which is ported, an inlet valve comprising a ported sleeve movably mounted in said cage between said walls and having an annular flange at one end, the inner wall carried by the cage having a face or edge against which the flange of said valve seats, and means for holding said sleeve valve to its seat.

15. The combination, in a valve structure, of a valve cage having concentric walls with ports in the outer wall, an inlet valve comprising an annular ported sleeve movably mounted in said cage between its walls, and inner and outer flanges carried by said sleeve for engagement with seats carried by said walls.

16. The combination, in a valve structure, of a valve cage having concentric walls with ports in the outer wall, an inlet valve comprising an annular ported sleeve movably mounted in said cage between its walls, inner and outer flanges carried by said sleeve for engagement with seats carried by said walls, and means for holding the flanges of said sleeve valve to their seats.

17. The combination, in a valve structure, of a valve cage, an annular sleeve having a portion forming a valve carried by said cage, a second valve disposed within said cage, both of said valves being arranged to open in the same direction, and a wall carried by said cage intermediate said valves and having seats for the same.

18. The combination, in a valve structure, of a valve cage having an inner annular wall, a sleeve valve exteriorly mounted with respect to said wall and seating against the lower edge of the same, and a second valve centrally disposed with respect to said annular wall and valve and engaging a seat of less diameter than the seat for the sleeve valve, both of said valves being operable independently of each other and contacting with their seats from the same direction.

19. The combination, in a valve structure, of a valve cage having ports, said cage having annular walls forming seats, a valve mounted so as to contact with the seat of least diameter carried by one of said walls, and a sleeve valve encircling said first valve, said sleeve valve being movably mounted in said cage and contacting with a seat adjacent the seat of smallest diameter and with a seat on the outer wall of said cage, both of said valves being arranged to open in the same direction.

20. The combination of a valve cage having inner and outer walls, one of which is ported, a sleeve valve slidably mounted exteriorly of said inner wall, and an exhaust valve mounted interiorly of said inner wall, the opening through the latter forming a passage for the exhaust.

In testimony whereof, I have signed my name to this specification, in the presence of two subscribing witnesses.

WILLIAM HENRY.

Witnesses:
MURRAY C. BOYER,
JOS. H. KLEIN.

---

Copies of this patent may be obtained for five cents each, by addressing the "Commissioner of Patents, Washington, D. C."